April 25, 1967 R. K. BOYER 3,315,695

VALVE EXTENSION

Filed Sept. 3, 1964

INVENTOR

RALPH K. BOYER

BY Teagno, Stover & Sadler

ATTORNEY

United States Patent Office 3,315,695
Patented Apr. 25, 1967

3,315,695
VALVE EXTENSION
Ralph K. Boyer, Cleveland, Ohio, assignor to Eaton Manufacturing Company, Cleveland, Ohio, a corporation of Ohio
Filed Sept. 3, 1964, Ser. No. 394,269
2 Claims. (Cl. 137—232)

This invention relates generally to an extension for the stem of an automobile tire valve assembly, or the like.

With the increased use of wheel discs or covers which substantially cover all of the metal wheel of a vehicle, the stem of the valve assembly which is normally or conventionally used with the tire or tube that is mounted on the wheel rim is not of sufficient length to enable the valve stem to be disposed in a serviceable position whereat the tire or tube may be inflated, deflated, gauged or in other ways serviced.

In order to overcome the fact that valve stems of conventional tire valve assemblies are not of sufficient length to be disposed in a serviceable position by reason of a wheel disc or cover being used in conjunction with the vehicle wheel, the valve stems were first made of greater lengths but since there is no standard size, shape or configuration for such wheel discs or covers and since such wheel discs or covers are not original equipment but are optional equipment sold as an accessory, it is not possible to standardize the length to which the normal or conventional valve stem should be extended.

Not only is it necessary that such valve stem extensions extend beyond the respective wheel discs or cover with which it is to function, so that it would be in an operable position for service so that the tire or tube which is associated therewith could be serviced by conventional type equipment, the valve stem extension should not protrude beyond a reasonable limit since an accessive length of valve extension would subject the extension to damage by reason of curbs, stones and other similar matter.

A solution to the difficulties which have occurred due to the extensive and greater use of wheel discs or covers is to install, as original equipment, a valve assembly having the shortest standard valve stem on the tube or tire and then include as a part of the optional equipment or accessory package a valve stem extension which is of the proper and correct length for the particular set of wheel discs or covers purchased by the customer.

Such solution to the problem briefly stated above results in an initial cost for a standard valve assembly plus a cost for an extension which is part of the package or set of wheel disc or covers purchased by the user and this combined cost will naturally exceed the cost of a single valve assembly of proper length if such single valve assembly was available as original equipment but due to the differences of sizes, shapes and configurations of wheel discs or covers which are available to the consumer and not knowing the fancy of the customers, it is not possible to predetermine the exact length for a valve stem if such valve stem is to be limited to part of the valve assembly as original equipment.

There has been a continuing effort to reduce the cost of valve stem extensions so that the combined cost of the extension and original equipment valve assembly would not exceed the cost of a single valve assembly or unitary structure which would serve the desired needs of the consumer.

Also, normally, a valve cap is employed to prevent dust, dirt and other undesirable materials from interfering with the proper function and operation of a valve assembly which may be employed in conjunction with an automobile tire or tube.

More particularly, this invention pertains to an inexpensive, easily fabricated valve extension so constituted and arranged as to be engageable with all types of valve assemblies to enable the valve stem thereof to be placed in a serviceable position when a wheel disc or cover is employed in conjunction therewith and to prevent dust, dirt and other undesirable elements from interfering with the proper valve operation.

Numerous valve extensions and protection devices have been made which in one way or another attempt to extend the valve stem beyond an associated wheel disc or cover to a serviceable position and also protect the valve mechanisms of the valve assembly from such hazards as dirt, water, and other undesirable elements which interfere with proper valve operation.

One well known device consists of a threaded cap which is inserted over a valve housing, such as the caps normally found on automobile tires. This type of valve protection device is cumbersome, since the cap must be removed to gauge the time, introduce air into the tire or to let air out. Moreover, often threaded caps of this type become difficult to remove, as dirt, and rain water, in the case of automobile tires, tend to cement the caps to the valve casings.

In order to overcome these difficulties, various types of valve stem extensions or caps have been produced which are expensive and difficult to manufacture. What the art still lacks is a valve extension which is readily insertable over a valve housing to extend the valve housing to a location whereat the valve assembly is in a serviceable position, permits the introduction, gauging or exhausting of air through the valve without removing the extension, and protects the valve assembly from dirt, water, and other hazards to the valve, but is yet easily fabricated and inexpensive.

Furthermore, all of the valve extensions disclosed in the prior art require at least four parts or elements, for example, a casing, a valve actuating member or pin, a spring member, and a guide or retaining member for the spring member. The United States Patent to Broecker 2,178,828 discloses such a valve extension or dust cap wherein a fourth part (flanged cup 46) is required as a seat for the lower end of the coil spring 42.

The present invention possesses the advantage of requiring only three parts, i.e., a casing, a valve actuating member or pin, and a spring member, and this is both simple and inexpensive to manufacture yet is reliable and durable in use. The valve extension of the present invention comprises a spring member which is so constructed and arranged as to seat itself within the casing and thus there is no need for providing a separate or additional spring retaining or seating member.

Accordingly, one primary object of this invention is to provide a new and improved valve extension which is so constituted and arranged as to overcome all the above-mentioned deficiencies in the prior art valve caps and extensions and still possess the desired features as stated herein.

Another primary object of this invention is to provide a valve extension which is so constituted and arranged as to be readily insertable over ordinary valve housings and dispose the valve assembly at an operable position in conjunction with any wheel disc or cover that may be employed in conjunction therewith to permit the gauging, introduction or exhausting of air through the valve without removing the extension and to protect the valve from dirt, water, and other hazards, while still being easily fabricated and inexpensive to manufacture.

Still another primary object of the present invention is to provide a new and improved valve extension which is so constituted and arranged as to overcome prior art deficiencies with an absolute minimum of structural elements which are easily fabricated, inexpensive, easy to assemble, and cooperate mutually with the valve and valve housing to accomplish the desired ends.

A still further primary object of this invention is the provision of a new and improved valve extension which is so constituted and arranged as to consist of only three component parts or elements which are easily and inexpensively manufactured and assembled.

With these and other objects in view, the present invention contemplates a valve extension which may be inserted over or mounted on a valve housing and projects generally outwardly therefrom to a location which may be beyond a wheel disc or cover that is associated therewith so that the valve extension is disposed in a position whereat the valve assembly may be serviced and further, the valve extension also protects the valve assembly from dirt, water, and other hazards, and which may be utilized to actuate the valve while it is mounted thereon. The extension may include, for example, a plunger so constituted and arranged as to act as a closure member for the extension and adapted to open the valve as well as the extension upon depression of the plunger. A resilient device such as a spring may be provided for normally urging the closure member toward a position to close the extension, and may be structurally operatively associated with the plunger and valve housing to act as a guide for the plunger and so cooperate with the housing as to be supported thereby.

Other objects and important features of the present invention will be apparent from a study of the specification following, taken with the drawing, which together show, illustrate, describe, and disclose a preferred embodiment or modification of the invention and what is now considered to be the best mode of practicing the principles thereof. Other embodiments or modifications may be suggested to those having the benefits of the teachings herein, and such other embodiments or modifications are intended to be reserved especially as they fall within the scope and spirit of the subjoined claims.

Figure 1:
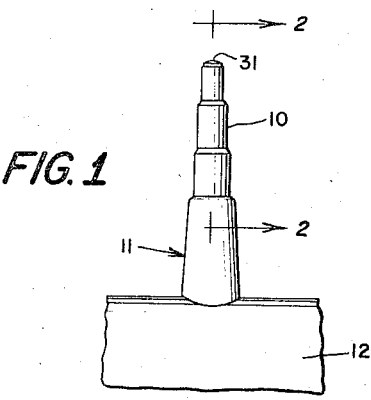
FIGURE 1 is a perspective view of a valve extension inserted over a valve housing, which extension is constructed in accordance with the principles of the present invention.
Figure 2:
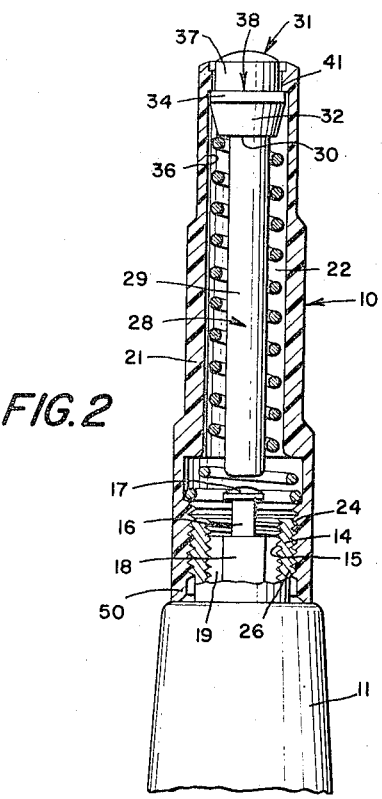
FIGURE 2 is a partially sectioned view of the valve extension taken along line 2–2 of FIGURE 1, particularly illustrating the novel structure and components thereof which form the present invention.

Referring now to the drawing, there is illustrated in FIGURES 1 and 2 a valve extension 10 which is structurally adapted to be inserted over or mounted on a valve housing 11 of a standard or conventional valve assembly for an automobile tire or tube 12 or the like. The valve extension 10 is of suitable longitudinal length to enable the extension 10 to project from the housing 11 of the conventional valve assembly to a location which may be to the opposed side of a wheel disc or cover, not illustrated, so that the valve extension 10 will place the valve assembly in a position whereat the tire or tube 12 may be serviced by gauging, inflation or deflation as the case may be. The valve housing 11 is integrally formed with or structurally attached to the tire or tube 12 and thus is advantageously formed of rubber or a synthetic equivalent thereof.

A generally cylindrical metallic sleeve 14 is fixedly mounted in any suitable manner within the housing 11 and extends upwardly beyond the housing 11. The sleeve 14 is internally threaded at 15 and threadably receives an externally threaded guide member 18 having recessed portions 19 therein to allow the passage of air between the sleeve 14 and the guide member 18.

A valve stem 16 extends through a substantially central aperture (not shown) of the guide member 18 and is provided with a valve head 17 at the upper or outer end thereof. Downward movement of the valve head 17 and the stem 16, therefore, opens the tire valve assembly in a conventional manner (not shown) and thus allows the tire or tube 12 to be gauged, inflated or deflated.

It is to be understood that the disclosure of the valve assembly herein is for illustrative purposes only, and it will be readily seen that any suitable or conventional tire valve construction may be utilized without departing from the principles of the instant invention.

The valve extension 10 comprises a generally tubular casing 21 formed of a suitable plastic or metallic material. The tubular casing 21 is provided with a substantially cylindrical bore 22 which extends generally longitudinally therethrough with a lower end portion 50 of the bore 22 being enlarged with the inner surface of the casing 21 adjacent thereto being provided with internal threads 24 that are so constituted and arranged as to be engageable with external threads 26 formed on the outer surface of the valve sleeve 14. It will be readily seen, therefore, that the valve extension 10 can be easily mounted on the tire or tube valve assembly by threading the enlarged interiorly threaded lower end portion 50 of the casing 21 onto the exteriorly threaded upper portion of the valve sleeve 14 until the lower end portion 50 of the casing 21 contacts the upper portion of the valve housing 11.

Figure 3:
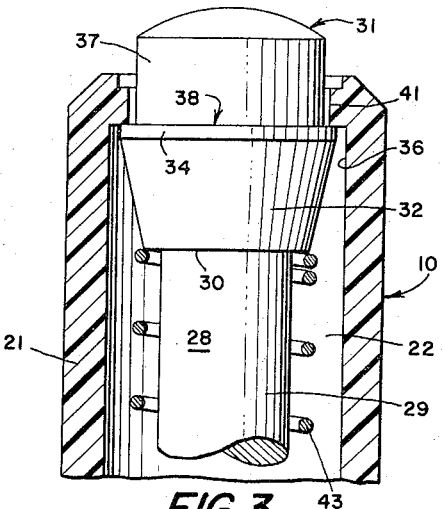
FIGURE 3 is an enlarged view of the upper portion of the valve extension illustrated in FIGURE 2.
Figure 4:
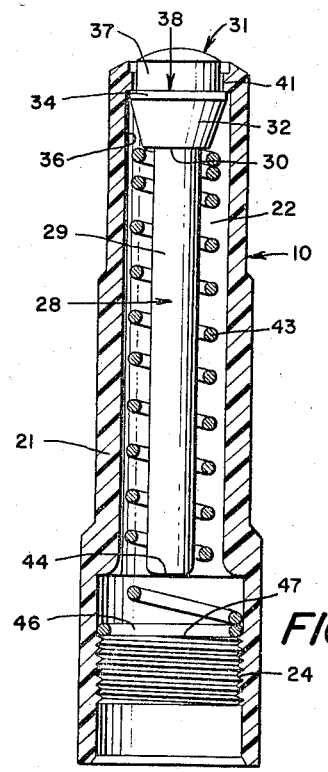
FIGURE 4 is a partially sectioned elevational view of the valve extension per se prior to the mounting thereof onto a valve housing.

As shown in FIGURES 2 through 4, the valve extension 10 further comprises an elongate valve actuating member 28 formed of a suitable plastic or metallic material and comprising a generally cylindrical shaft portion 29 disposed within the longitudinal bore 22 of the casing 21. The upper or outer end 30 of the shaft portion 29 has a closure member 31 preferably formed integral therewith and of the same material as the shaft portion 29. The closure member 31 is provided with a lower, downwardly tapered section 32 which merges at the upper end portion thereof with a generally cylindrical section 34 having a vertically extending outer wall of smaller diameter than the adjacent inner surface 36 of the casing 21 defining the bore 22.

Extending upwardly from the cylindrical section 34 and beyond the upper end of the casing 21, is a generally cylindrical knob portion 37 of smaller diameter than the cylindrical section 34 so as to define an annular ledge 38 on the upper surface of the cylindrical section 34.

The casing 21 is provided with an inwardly extending, annular portion 41 which is slightly larger in diameter than the knob portion 37 and slightly smaller in diameter than the cylindrical section 34 so as to serve as a seat for the latter and to be engageable with the ledge 38 thereof to serve to prevent dust, dirt or other impurities from entering the valve extension casing 21 and thus then into the valve housing 11.

A resilient coil spring 43 of any suitable material is positioned closely around the shaft portion 29 of the valve actuating member 28 and has the upper end or coil thereof in engagement with the lower end of the tapered section 32. The spring 43 is radially dimensioned to fit in the annular space between the shaft portion 29 and the inner wall 36 of the casing 21, and closely surrounds the shaft portion 29 to act as a guide therefor to insure that a lower end portion 44 of the shaft portion 29 will contact the valve head 17 when the valve actuating member 28 is moved downwardly.

The spring 43 is provided at the inner end portion thereof with the end or lowermost turns or coils 46 which have a diameter that is larger than the remaining coils of the spring, which are of substantially uniform diameter, and is so dimensioned as to engage an upper end portion 47 of the internally threaded portion 24 of the valve extension casing 21. The enlarged, lowermost coil 46 of the spring 43, therefore, serves to provide an integral seat for the spring 43 and thus avoids the necessity of providing a separate spring-supporting or seating member within the casing 21.

Additionally, since the spring 43 closely surrounds the shaft portion 29 of the valve actuating member 28 and thus acts as a guide therefor, the present valve extension construction also avoids the necessity of providing a separate guide member for the valve actuating member 28.

In order to assemble the valve extension 10, the valve actuating member 28 is first inserted within the lower end 50 of the casing 21 until the ledge 38 of the cylindrical section 34 contacts the annular casing portion 41, as shown in FIGURE 2. Thereafter, the spring 43 is positioned around the shaft portion 29 with the large diameter turn or coil 46 thereof disposed near the lower end 50 of the casing 21 and in contact with the upper end 47 of the threaded section 24 of the casing 21. The valve extension casing 21 may then be threaded onto the valve sleeve 14 and tightened thereon.

As seen in FIGURE 2, the spring 43 is so dimensioned and proportioned as to urge the ledge 38 of the cylindrical closure member section 34 into engagement with the annular portion or seat 41 of the casing 21. Since the lower end 50 of the casing 21 contacts the valve housing 11 when the extension 10 is mounted on the valve sleeve 14, it will be readily seen that dirt, water and other foreign materials are prevented from contacting the threads 24 and 26 of the casing 21 and sleeve 14, respectively, to thus insure easy removal of the valve extension 10 when it is desired.

In operation, air is removed from the tire or tube 12 through the valve housing 11 by depressing the closure member 31 to move the shaft portion 29 downwardly, against the force of and guided by the spring 43, into contact with the valve head 17, thus moving the head 17 and valve stem 16 downwardly to release air from the tire or tube 12 through the housing 11, past the guide member 18 via the recessed portions 19 thereof, through the valve extension casing 21 and past the wall 34 of the closure member 31.

To introduce air into the valve housing 11 and the tire or tube 12, the closure member 31 is depressed to move the valve head 17 and the stem 16 downwardly, as explained above, and in this instance a standard air hose coupling may be utilized to supply air into the casing 21, past the valve guide member 18, through the valve housing 11 and into the tire 12.

While the invention has been shown, illustrated, described and disclosed in terms of an embodiment or modification it has assumed in practice, the scope of the invention should not be deemed to be limited by the precise embodiment or modification herein shown, illustrated, described and disclosed, such other embodiments or modifications intended to be reserved especially as they fall within the scope of the claims appended.

What is claimed is:

1. In a valve extension for a valve of the type found on an automobile tire wherein the valve is provided with a housing, an externally threaded portion extending from the housing, and a valve actuating stem disposed within the threaded portion, a generally cylindrical casing having a longitudinal bore with an enlarged bore portion adjacent one end thereof, said casing having internal threads in a reduced diameter portion thereof adjacent said enlarged bore portion, said internal threads being adapted to be structurally operatively associated with the threaded valve portion to mount said casing on the valve portion, said one end of said casing being adapted to contact the valve housing when said casing is mounted on the valve portion, said casing having an annular seat extending inwardly into said bore adjacent the other end thereof, an elongated valve actuating member movably disposed within said casing bore and comprising a shaft portion of smaller diameter than said bore and adapted to engage the valve stem, and a closure member formed integral with one end of said shaft portion and being disposed adjacent said other end of said casing, said closure member comprising a radially enlarged outer knob portion having a shoulder formed therearound intermediate the ends of said enlarged portion of smaller diameter than the interior surface of said casing defining said bore and of larger diameter than said seat, one end of said knob portion being adapted to extend through and outwardly of said annular casing seat, said shoulder being adapted to contact the inner surface of said seat, and the other end of said knob portion being disposed in said bore inwardly of said seat, a resilient coil spring closely surrounding said shaft portion of said valve actuating member and being freely disposed within said casing bore, said bore, shaft and spring being of such diameters that lateral movement of said spring and shaft within said bore is substantially eliminated by engagement of said shaft with said spring and said spring with said bore, respectively, said coil spring having the outer end thereof in contact with said other end of said knob portion to urge said shoulder of said knob portion into engagement with said casing seat.

2. The valve extension as recited in claim 1 wherein said coil spring is provided with an enlarged coil at one end thereof which is in engagement with the adjacent end of said internally threaded casing portion to serve as a seat for said coil spring.

References Cited by the Examiner

UNITED STATES PATENTS

| | | | |
|---|---|---|---|
| 1,989,994 | 2/1935 | Lear | 137—233 |
| 2,178,828 | 11/1939 | Broecker | 137—630.22 X |
| 2,854,020 | 9/1958 | Williams | 137—232 |

WILLIAM F. O'DEA, *Primary Examiner.*

D. H. LAMBERT, *Assistant Examiner.*